US009331543B2

(12) United States Patent
Hamer et al.

(10) Patent No.: US 9,331,543 B2
(45) Date of Patent: May 3, 2016

(54) ELECTRIC MACHINE MODULE COOLING SYSTEM AND METHOD

(75) Inventors: Colin J. Hamer, Noblesville, IN (US); Matthew Obras, Pendleton, IN (US); Bradley D. Chamberlin, Pendleton, IN (US)

(73) Assignee: Remy Technologies, LLC, Pendleton, IN (US)

( * ) Notice: Subject to any disclaimer, the term of this patent is extended or adjusted under 35 U.S.C. 154(b) by 582 days.

(21) Appl. No.: 13/440,915

(22) Filed: Apr. 5, 2012

(65) Prior Publication Data

US 2013/0264034 A1 Oct. 10, 2013

(51) Int. Cl.
*H02K 9/19* (2006.01)
*H02K 5/20* (2006.01)

(52) U.S. Cl.
CPC .. *H02K 5/20* (2013.01); *H02K 9/19* (2013.01); *H02K 2213/09* (2013.01); *Y10T 29/4935* (2015.01)

(58) Field of Classification Search
CPC ............................ H02K 5/20; H02K 9/00–9/28
USPC ..................... 310/52, 54, 58, 59, 60 R, 61–63
See application file for complete search history.

(56) References Cited

U.S. PATENT DOCUMENTS

| | | | |
|---|---|---|---|
| 2,080,678 A | 5/1937 | Van Horn et al. | |
| 2,264,616 A | 12/1941 | Buckbee | |
| 2,683,823 A * | 7/1954 | Wightman et al. | ............. 310/52 |
| 3,447,002 A | 5/1969 | Ronnevig | |
| 3,525,001 A | 8/1970 | Erickson | |
| 3,748,507 A | 7/1973 | Sieber | |
| 4,038,570 A | 7/1977 | Durley, III | |
| 4,936,543 A * | 6/1990 | Kamibayasi | ............. 251/129.15 |
| 5,081,382 A | 1/1992 | Collings et al. | |
| 5,180,004 A | 1/1993 | Nguyen | |
| 5,207,121 A | 5/1993 | Blen | |
| 5,293,089 A | 3/1994 | Frister | |
| 5,372,213 A | 12/1994 | Hasebe et al. | |
| 5,519,269 A | 5/1996 | Lindberg | |
| 5,616,973 A | 4/1997 | Khazanov | |
| 5,859,482 A | 1/1999 | Crowell et al. | |

(Continued)

FOREIGN PATENT DOCUMENTS

| | | |
|---|---|---|
| JP | 05-103445 A | 4/1993 |
| JP | 05-292704 A | 11/1993 |
| JP | 06-036364 U | 5/1994 |
| JP | 06-311691 A | 11/1994 |
| JP | 07-264810 A | 10/1995 |

(Continued)

OTHER PUBLICATIONS

International Search Report, Received Jan. 9, 2012.

(Continued)

*Primary Examiner* — Thomas Truong
(74) *Attorney, Agent, or Firm* — Greenberg Traurig, LLP

(57) ABSTRACT

Some embodiments of the invention provide an electric machine module including a housing that defines a machine cavity. A coolant jacket can be at least partially defined by the housing. In some embodiments, a plurality of coolant apertures can be disposed through portions of the housing to fluidly connect the coolant jacket and the machine cavity. One or more solenoid assemblies can be at least partially supported by the housing and positioned substantially adjacent to at least some of the coolant apertures. The solenoid assemblies can be configured to regulate passage of a coolant into the machine cavity from the coolant jacket.

13 Claims, 8 Drawing Sheets

(56) References Cited

U.S. PATENT DOCUMENTS

| | | |
|---|---|---|
| 5,923,108 A | 7/1999 | Matake et al. |
| 5,937,817 A | 8/1999 | Schanz et al. |
| 5,965,965 A | 10/1999 | Umeda et al. |
| 6,011,332 A | 1/2000 | Umeda et al. |
| 6,069,424 A | 5/2000 | Colello et al. |
| 6,075,304 A | 6/2000 | Nakatuska |
| 6,087,746 A | 7/2000 | Couvert |
| 6,095,754 A | 8/2000 | Ono |
| 6,097,130 A | 8/2000 | Umeda et al. |
| 6,114,784 A | 9/2000 | Nakano |
| 6,147,430 A | 11/2000 | Kusase et al. |
| 6,147,432 A | 11/2000 | Kusase et al. |
| 6,173,758 B1 | 1/2001 | Ward et al. |
| 6,181,043 B1 | 1/2001 | Kusase et al. |
| 6,201,321 B1 | 3/2001 | Mosciatti |
| 6,208,060 B1 | 3/2001 | Kusase et al. |
| 6,232,687 B1 | 5/2001 | Hollenbeck et al. |
| 6,242,836 B1 | 6/2001 | Ishida et al. |
| 6,291,918 B1 | 9/2001 | Umeda et al. |
| 6,300,693 B1 | 10/2001 | Poag et al. |
| 6,313,559 B1 | 11/2001 | Kusase et al. |
| 6,333,573 B1 | 12/2001 | Nakamura |
| 6,335,583 B1 | 1/2002 | Kusase et al. |
| 6,346,758 B1 | 2/2002 | Nakamura |
| 6,359,232 B1 | 3/2002 | Markovitz et al. |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,509,665 B1 | 1/2003 | Nishiyama et al. |
| 6,515,392 B2 | 2/2003 | Ooiwa |
| 6,522,043 B2 | 2/2003 | Measegi |
| 6,559,572 B2 | 5/2003 | Nakamura |
| 6,579,202 B2 | 6/2003 | El-Antably et al. |
| 6,770,999 B2 | 8/2004 | Sakurai |
| 6,897,594 B2 | 5/2005 | Ichikawa et al. |
| 6,903,471 B2 | 6/2005 | Arimitsu et al. |
| 6,998,749 B2 | 2/2006 | Wada et al. |
| 7,002,267 B2 | 2/2006 | Raszkowski et al. |
| 7,026,733 B2 | 4/2006 | Bitsche et al. |
| 7,211,913 B2 * | 5/2007 | Tsutsui et al. .................. 310/54 |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,402,923 B2 | 7/2008 | Klemen et al. |
| 7,417,344 B2 | 8/2008 | Bradfield |
| 7,468,564 B2 * | 12/2008 | Crisafulli ..................... 290/52 |
| 7,508,100 B2 | 3/2009 | Foster |
| 7,538,457 B2 | 5/2009 | Holmes et al. |
| 7,545,060 B2 | 6/2009 | Ward |
| 7,576,459 B2 * | 8/2009 | Down et al. .................... 310/58 |
| 7,592,045 B2 | 9/2009 | Smith et al. |
| 7,615,903 B2 | 11/2009 | Holmes et al. |
| 7,615,951 B2 | 11/2009 | Son et al. |
| 7,667,359 B2 | 2/2010 | Lee et al. |
| 7,939,975 B2 | 5/2011 | Saga et al. |
| 8,067,865 B2 | 11/2011 | Savant |
| 8,068,327 B2 | 11/2011 | Seifert et al. |
| 2003/0222519 A1 | 12/2003 | Bostwick |
| 2004/0036367 A1 | 2/2004 | Denton et al. |
| 2004/0189110 A1 | 9/2004 | Ide |
| 2004/0195929 A1 | 10/2004 | Oshidari |
| 2005/0023266 A1 | 2/2005 | Ueno et al. |
| 2005/0023909 A1 | 2/2005 | Cromas |
| 2005/0194551 A1 | 9/2005 | Klaussner et al. |
| 2005/0274450 A1 | 12/2005 | Smith et al. |
| 2005/0285456 A1 | 12/2005 | Amagi et al. |
| 2007/0024130 A1 | 2/2007 | Schmidt |
| 2007/0052313 A1 | 3/2007 | Takahashi |
| 2007/0063607 A1 | 3/2007 | Hattori |
| 2007/0145836 A1 | 6/2007 | Bostwick |
| 2007/0149073 A1 | 6/2007 | Klaussner et al. |
| 2007/0216236 A1 | 9/2007 | Ward |
| 2008/0223557 A1 | 9/2008 | Fulton et al. |
| 2009/0121562 A1 | 5/2009 | Yim |
| 2009/0174278 A1 | 7/2009 | Sheaffer et al. |
| 2009/0206687 A1 | 8/2009 | Woody et al. |
| 2010/0026111 A1 | 2/2010 | Monzel |
| 2010/0102649 A1 | 4/2010 | Cherney et al. |
| 2010/0109454 A1 | 5/2010 | Vadillo et al. |
| 2010/0176668 A1 | 7/2010 | Murakami |
| 2011/0050141 A1 | 3/2011 | Yeh et al. |
| 2011/0101700 A1 | 5/2011 | Stiesdal |
| 2011/0109095 A1 | 5/2011 | Stiesdal |

FOREIGN PATENT DOCUMENTS

| | | |
|---|---|---|
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 4187606 B2 | 11/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

International Search Report, Received Feb. 16, 2012.
International Search Report, Received Dec. 22, 2011.
International Search Report, Received Dec. 5, 2011.
International Search Report, Received Dec. 27, 2011.
International Search Report completed Apr. 19, 2012.
International Search Report completed Apr. 9, 2012.
International Search Report completed Apr. 20, 2012.
International Search Report completed Mar. 8, 2012.
International Search Report completed Apr. 24, 2012.
WIPO Search Report and Written Opinion dated Oct. 29, 2012 for corresponding Application No. PCT/US2012/033915; 8 sheets.
WIPO Search Report and Written Opinion dated Nov. 14, 2012 for corresponding Application No. PCT/US2012/040794; 8 sheets.
International Search Report, Received Jul. 31, 2012.

* cited by examiner

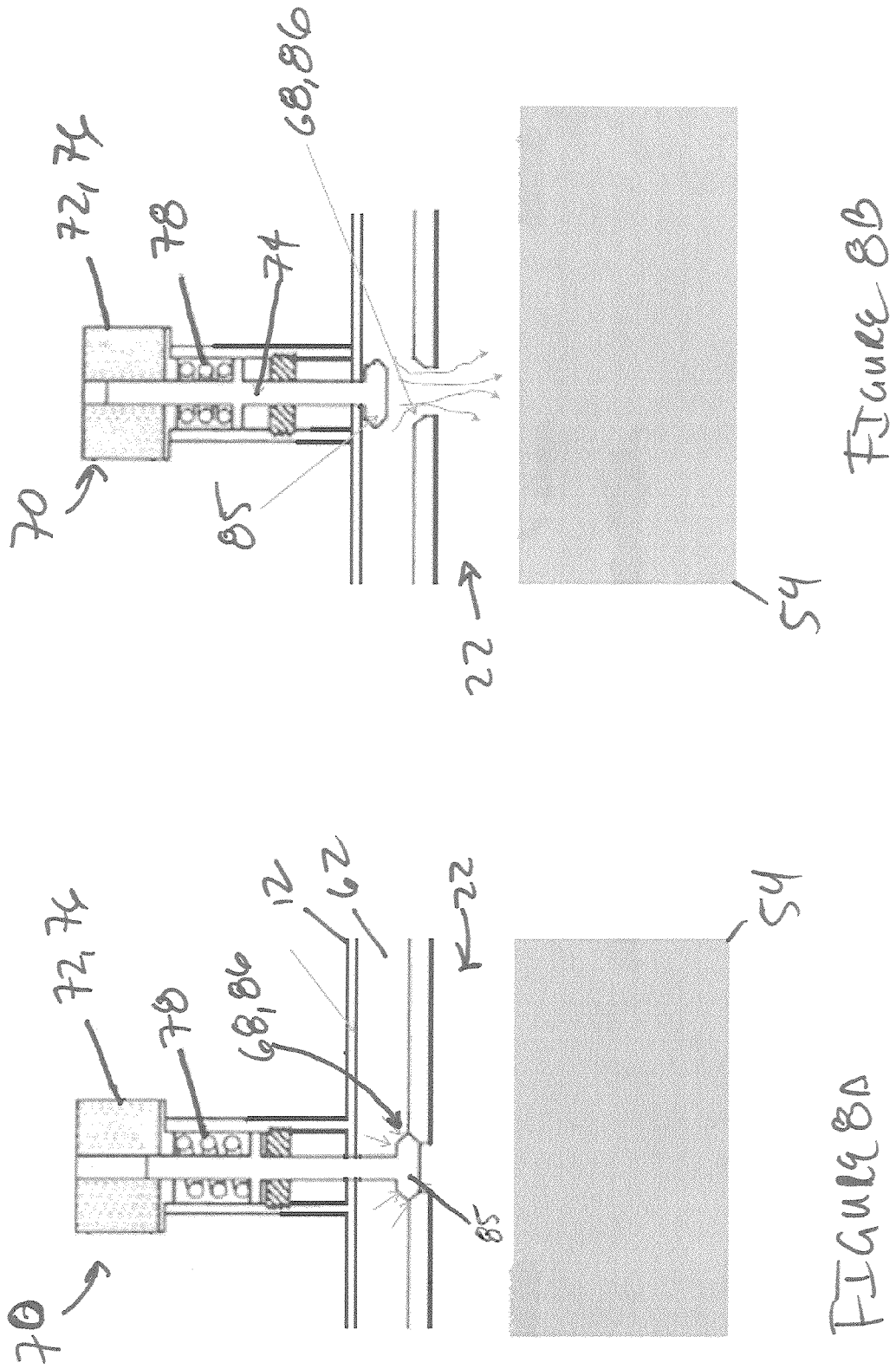

ELECTRIC MACHINE MODULE COOLING SYSTEM AND METHOD

BACKGROUND

Some conventional electric machines include a stator assembly disposed around a rotor assembly. Some stator assemblies include a plurality of conductors positioned within a stator core. During operation of some electric machines, a current flows through the at least some of the conductors. In order to prevent potential short circuit events and or grounding incidents, some conventional configurations for stator assemblies require multiple insulation layers between and amongst the conductors. Moreover, during operation of some electric machines, heat energy can be generated by both the stator assembly and the rotor assembly, as well as some other components of the electric machine. The increase in heat energy produced by some elements of the electric machine can lead to inefficient machine operations.

SUMMARY

Some embodiments of the invention provide an electric machine module including a housing that can define a machine cavity. A coolant jacket can be at least partially defined by the housing. In some embodiments, a plurality of coolant apertures can be disposed through portions of the housing to fluidly connect the coolant jacket and the machine cavity. In some embodiments, one or more solenoid assemblies can be at least partially supported by the housing and positioned substantially adjacent to at least some of the coolant apertures. In some embodiments, the solenoid assemblies can be configured to regulate passage of a coolant into the machine cavity from the coolant jacket.

Some embodiments of the invention provide an electric machine module including a housing that can at least partially define a machine cavity. In some embodiments, a coolant jacket can be at least partially defined by the housing. In some embodiments, an electric machine comprising stator end turns can be at least partially disposed within the machine cavity so that portions of the electric machine can be at least partially circumscribed by the coolant jacket. In some embodiments, a plurality of coolant apertures can be disposed through portions of the housing to fluidly connect the coolant jacket and the machine cavity. At least some of the coolant apertures can be substantially adjacent to the stator end turns. In some embodiments, one or more solenoid assemblies, which can include a plunger, can be at least partially supported by the housing and can be positioned substantially adjacent to at least a portion of the plurality of coolant apertures. In some embodiments, the plunger of at least some of the solenoid assemblies can be configured and arranged to engage a portion of at least some of the plurality of coolant apertures. In some embodiments, an electronic control module can be in communication with at least a portion of the solenoid assemblies.

DESCRIPTION OF THE DRAWINGS

FIG. 8A is a partial cross-sectional view of a de-energized solenoid assembly according to one embodiment of the invention.

FIG. 8B is a partial cross-sectional view of an energized solenoid assembly according to one embodiment of the invention.

DETAILED DESCRIPTION

Figure 1:
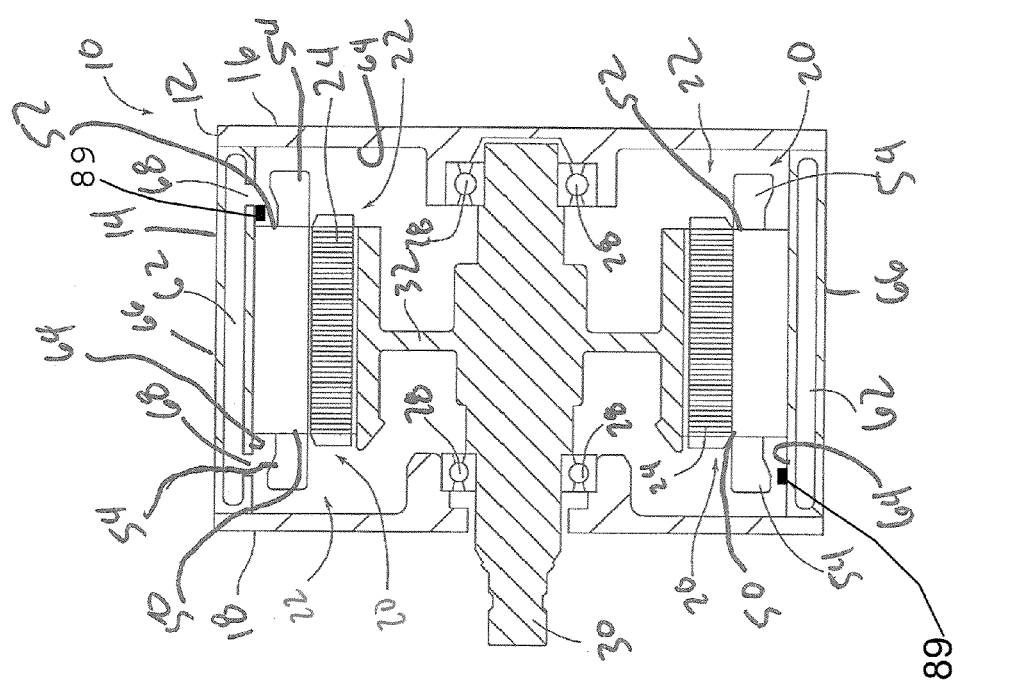
FIG. 1 is a cross-sectional view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Figure 2:
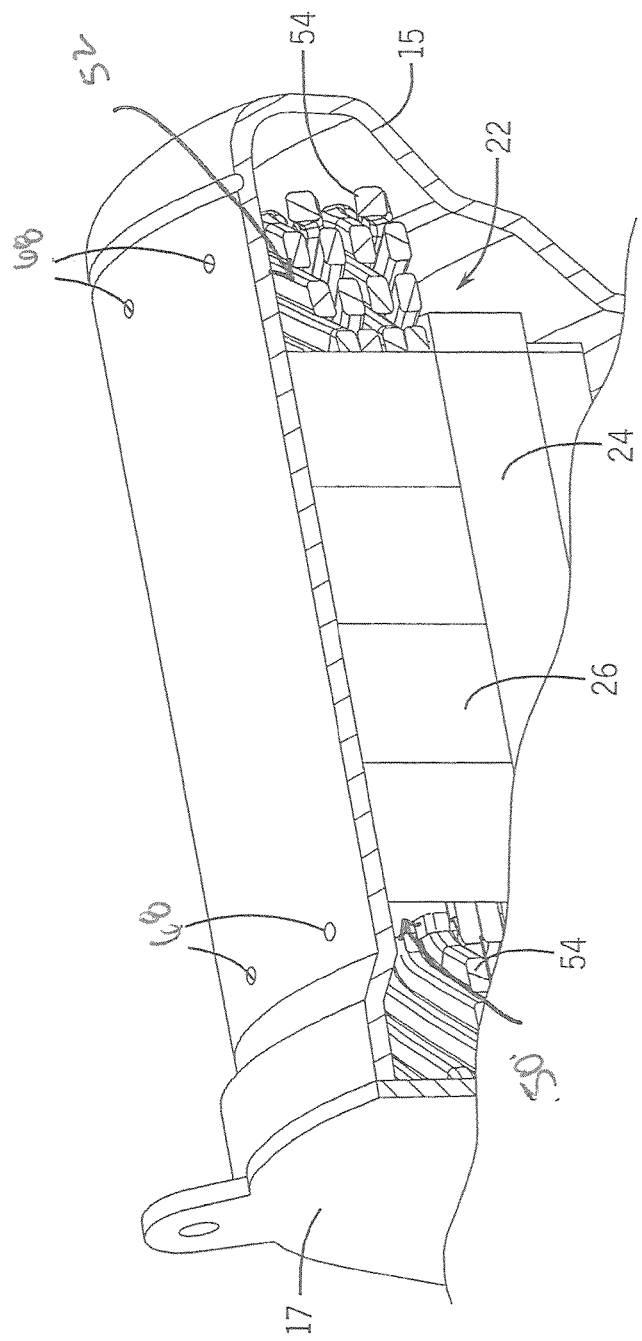
FIG. 2 is a perspective view of an electric machine module according to one embodiment of the invention.

FIGS. 1 and 2 illustrate an electric machine module 10 according to one embodiment of the invention. The module 10 can include a housing 12 comprising a sleeve member 14, a first end cap 16, and a second end cap 18. An electric machine 20 can be housed within a machine cavity 22 at least partially defined by the sleeve member 14 and the end caps 16, 18. For example, the sleeve member 14 and the end caps 16, 18 can be coupled via conventional fasteners (not shown), or another suitable coupling method, to enclose at least a portion of the electric machine 20 within the machine cavity 22. In some embodiments, the housing 12 can comprise a substantially cylindrical canister 15 coupled to an end cap 17, as shown in FIG. 2. Further, in some embodiments, the housing 12 can comprise materials that can generally include thermally conductive properties, such as, but not limited to aluminum or other metals and materials capable of generally withstanding operating temperatures of the electric machine. In some embodiments, the housing 12 can be fabricated using different methods including casting, molding, extruding, and other similar manufacturing methods.

In some embodiments, the housing 12 (i.e., the sleeve member 14 and end caps 16, 18 and/or the canister 15 and the end cap 17) can be disposed within an additional support member (not shown). For example, the support member can comprise another housing (e.g., a transmission housing) into which the housing 12 can be disposed or to which the housing 12 can be coupled. By way of example only, in some embodiments, a recess can be defined between the housing 12 and the support member. For example, as discussed in greater detail below, one or more coolant jackets can be defined between the housing 12 and the support member.

The electric machine 20 can include a rotor assembly 24, a stator assembly 26, and bearings 28, and can be disposed about a shaft 30. As shown in FIG. 1, the stator assembly 26 can substantially circumscribe at least a portion of the rotor assembly 24. In some embodiments, the rotor assembly 24 can also include a rotor hub 32 or can have a "hub-less" design (not shown).

In some embodiments, the electric machine 20 can be operatively coupled to the housing 12. For example, the electric machine 20 can be fit within the housing 12. In some embodiments, the electric machine 20 can be fit within the housing 12 using an interference fit, a shrink fit, other similar friction-based fits that can at least partially operatively couple the machine 20 and the housing 12. For example, in some embodiments, the stator assembly 26 can be shrunk fit into the module housing 12. Further, in some embodiments, the fit can at least partially secure the stator assembly 26, and as a result, the electric machine 20, in axial, radial and circumferential directions. In some embodiments, during operation of the electric machine 20 the fit between the stator assembly 26 and the housing 12 can at least partially serve to transfer torque from the stator assembly 26 to the housing 12. In some embodiments, the fit can result in a generally greater amount of torque retained by the module 10.

The electric machine 20 can be, without limitation, an electric motor, such as a hybrid electric motor, an electric generator, or a vehicle alternator. In one embodiment, the electric machine 20 can be a High Voltage Hairpin (HVH) electric motor, an interior permanent magnet electric motor, or an induction motor for hybrid vehicle applications.

Figure 3:
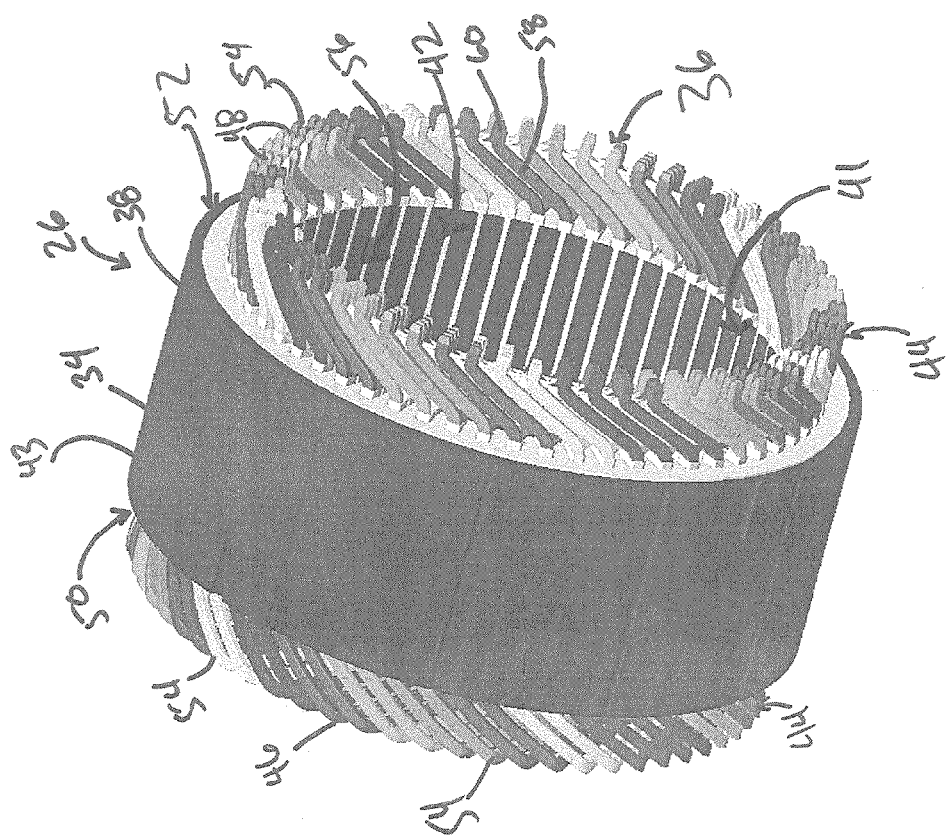
FIG. 3 is a perspective view of a stator assembly according to one embodiment of the invention.
Figure 4:
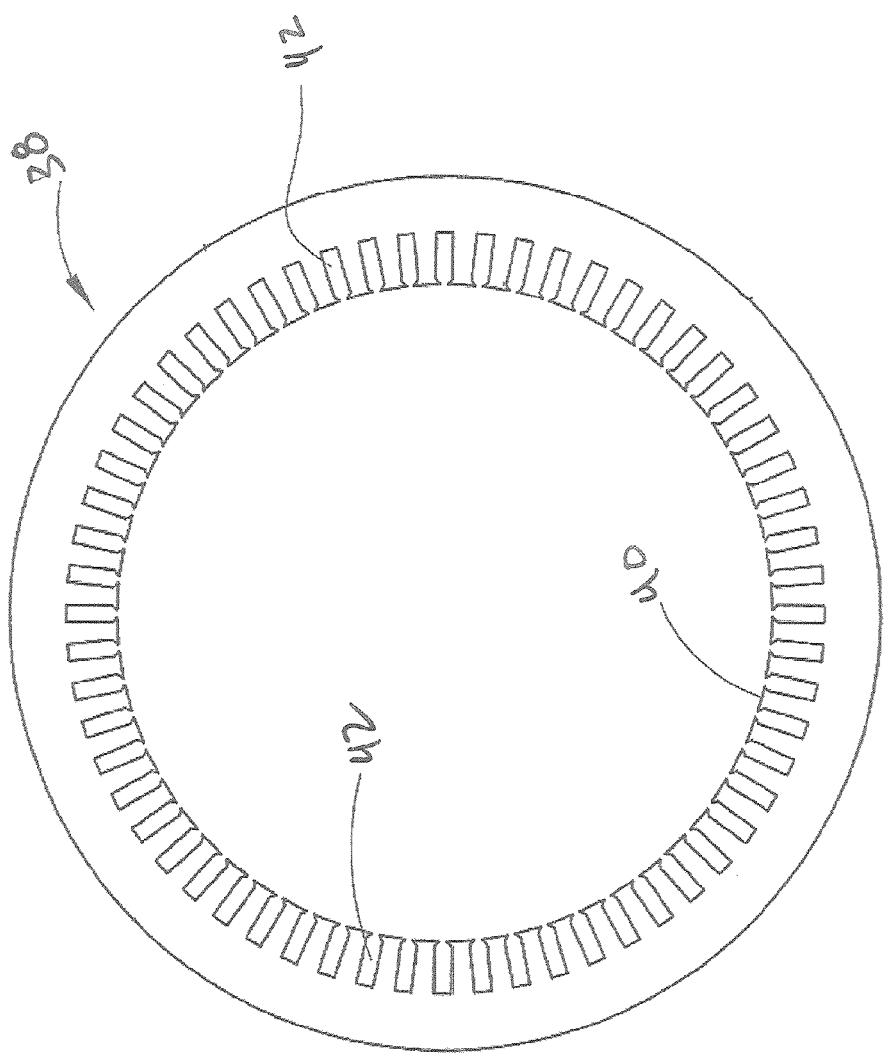
FIG. 4 is front view of a stator lamination according to one embodiment of the invention.

As shown in FIG. 3, in some embodiments, the stator assembly 26 can comprise a stator core 34 and a stator winding 36 at least partially disposed within a portion of the stator core 34. For example, in some embodiments, the stator core 34 can comprise a plurality of laminations 38. Referring to FIG. 4, in some embodiments, the laminations 38 can comprise a plurality of substantially radially-oriented teeth 40. In some embodiments, as shown in FIG. 3, when at least a portion of the plurality of laminations 38 are substantially assembled, the teeth 40 can substantially align to define a plurality of slots 42 that are configured and arranged to support at least a portion of the stator winding 36. As shown in FIG. 4, in some embodiments, the laminations 38 can include sixty teeth 40, and, as a result, the stator core 28 can include sixty slots 42. In other embodiments, the laminations 38 can include more or fewer teeth 40, and, accordingly, the stator core 34 can include more or fewer slots 42. Moreover, in some embodiments, the stator core 34 can comprise an inner perimeter 41 and an outer perimeter 43. For example, in some embodiments, the stator core 34 can comprise a substantially cylindrical configuration so that the inner and outer perimeters 41, 43 can comprise inner and outer diameters, respectively. However, in other embodiments, the stator core 34 can comprise other configurations (e.g., square, rectangular, elliptical, regular or irregular polygonal, etc.), and, as a result, the inner and outer perimeters 41, 43 can comprise other dimensions.

Figure 5:
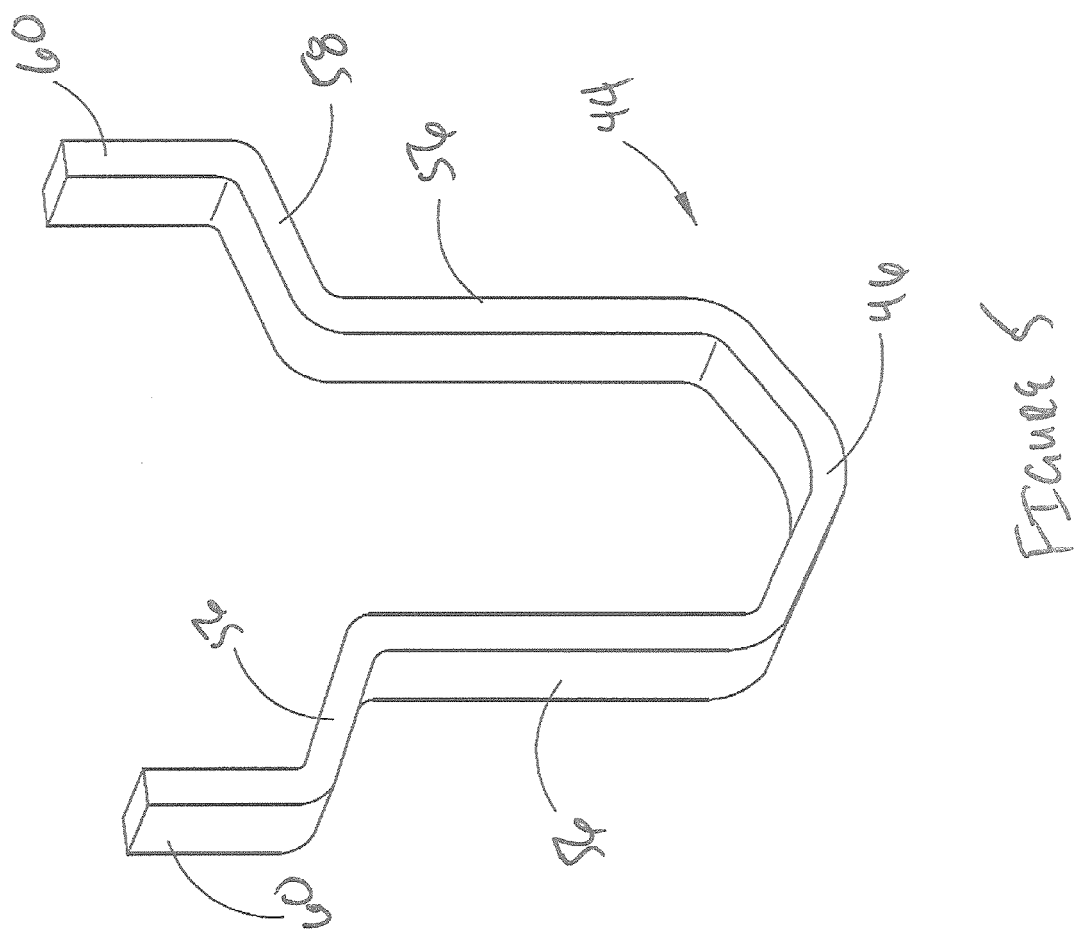
FIG. 5 is a perspective view of a conductor according to one embodiment of the invention.

In some embodiments, the stator winding 36 can comprise a plurality of conductors 44. In some embodiments, the conductors 44 can comprise a substantially segmented configuration (e.g., a hairpin configuration), as shown in FIGS. 3 and 5. For example, in some embodiments, at least a portion of the conductors 44 can include a turn portion 46 and at least two leg portions 48. The turn portion 46 can be disposed between the two leg portions 48 to connect the two leg portions 48, which can be substantially parallel. Moreover, in some embodiments, the turn portion 46 can comprise a substantially "u-shaped" configuration, although, in some embodiments, the turn portion 46 can comprise a v-shape, a wave shape, a curved shape, and other shapes. Additionally, in some embodiments, as shown in FIG. 5, at least a portion of the conductors 44 can comprise a substantially rectangular cross section. In some embodiments, at least a portion of the conductors 44 can comprise other cross-sectional shapes, such as substantially circular, square, hemispherical, regular or irregular polygonal, etc. In some embodiments, the conductors 44 can comprise other configurations (e.g., substantially non-segmented configuration). In some embodiments, as shown in FIG. 3, at least a portion of the conductors 44 can be positioned substantially within the slots 42. For example, in some embodiments, the stator core 34 can be configured so that the plurality of slots 42 are substantially axially arranged. The leg portions 48 can be inserted into the slots 42 so that at least some of the leg portions 48 can axially extend through the stator core 34. In some embodiments, the leg portions 48 can be inserted into neighboring slots 42. For example, the leg portions 48 of a conductor 44 can be disposed in slots that are distanced approximately one magnetic-pole pitch apart (e.g., six slots, eight slots, etc.). In some embodiments, a plurality of conductors 44 can be disposed in the stator core 34 so that at least some of the turn portions 46 of the conductors 44 axially extend from the stator core 34 at a first axial end 50 of the stator core 34 and at least some of the leg portions 48 axially extend from the stator core 34 at a second axial end 52 of the stator core 34. In some embodiments, at least a portion of the conductor 44 regions that axially extend from the core 34 at the axial ends 50, 52 can comprise stator end turns 54.

In some embodiments, the conductors 44 can be generally fabricated from a substantially linear conductor 44 that can be configured and arranged to a shape substantially similar to the conductor in FIG. 5. For example, in some embodiments, a machine (not shown) can apply a force (e.g., bend, push, pull, other otherwise actuate) to at least a portion of a conductor 44 to substantially form the turn portion 46 and the two leg portions 48 of a single conductor 44.

In some embodiments, at least some of the leg portions 48 can comprise multiple regions. The leg portions 48 can comprise in-slot portions 56, angled portions 58, and connection portions 60. In some embodiments, as previously mentioned, the leg portions 48 can be disposed in the slots 42 and can axially extend from the first end 50 to the second end 52. In some embodiments, after insertion, at least a portion of the leg portions 48 positioned within the slots 42 can comprise the in-slot portions 56. In some embodiments, in some or all of the slots 42, the leg portions 48 can be substantially radially aligned, as shown in FIG. 3. In some embodiments, in some or all of the slots 42, the leg portions 48 can comprise other configurations.

In some embodiments, at least some of stator end turns 54 extending from stator core 34 at the second axial end 52 can comprise the angled portions 58 and the connection portions 60. In some embodiments, after inserting the conductors 44 into the stator core 34, the leg portions 48 extending from the stator core 34 at the second axial end 52 can undergo a twisting process (not shown) that can lead to the formation of the angled portions 58 and the connection portions 60. For example, in some embodiments, the twisting process can give rise to the angled portions 58 at a more axially inward position and the connection portions 60 at a more axially outward position, as shown in FIGS. 3 and 5. In some embodiments, after the twisting process, the connection portions 60 of at least a portion of the conductors 44 can be immediately adjacent to connection portions 60 of other conductors 44. As a result, the connection portions 60 can be coupled together to form one or more stator windings 36. In some embodiments, the connection portions 60 can be coupled via welding, brazing, soldering, melting, adhesives, or other coupling methods. Additionally, in some embodiments, the angled portions 58 and the connection portions 60 can extend from the first axial end 50 and can be configured and arranged in a similar manner as some previously mentioned embodiments.

In some embodiments, some components of the electric machine 20 such as, but not limited to, the rotor assembly 24, the stator assembly 26, and the stator end turns 54, can generate heat during operation of the electric machine 20. For example, as reflected by the temperature values illustrated in FIG. 6, different regions of the stator assembly 26 (e.g., different regions of the stator end turns 54) can operate at different temperatures under different conditions. Under some or all conditions (e.g., varying operating speeds, loads, and operational direction), different regions of the stator assembly 26 can operate at greater and lesser temperatures. Moreover, during module 10 operations, some or all of the conditions, such as speed, load, and/or direction can change so that operating temperature in different regions can change as a result of the change in conditions. During module 10 operations, temperature in different regions of the stator end turns 54 can continuously change during operations of the module 10.

In order to create an optimized power density for the electric machine module 10, it can be desirable for the electric machine 20 to continuously operate at a high performance level, which can be achieved by relatively accurate and adequate cooling. In some conventional electric machine modules, cooling configurations can be fixed for the life of the module 10 (i.e., the cooling configuration can be predetermined during the design stage of the module 10 and incorporated in the physical design of the module 10). In some or all of these conventional modules, cooling (e.g., coolant flowing from a coolant jacket to the stator end turns 54) cannot be adapted to the thermal variations in the stator end turns 54. As a result, accurate and adequate cooling cannot be consistently achieved because under many conditions, some or all of the conventional module cooling configurations are not able to provide cooling to the changing thermal patterns of the stator end turns 54. As discussed below, some embodiments of the invention can comprise dynamic cooling configurations to enable some electric machine modules 10 to operate at or near continuous peak performance levels.

As shown in FIG. 1, in some embodiments, the housing 12 can comprise a coolant jacket 62. For example, in some embodiments, the sleeve member 14 can include an inner surface 64 and an outer surface 66 and the coolant jacket 62 can be positioned substantially between the surfaces 64, 66. As previously mentioned, in some embodiments, the canister 15 and end cap 17 can be disposed in another housing and a recess (not shown) can be defined between an outer perimeter of the canister 15 and the other housing (not shown). In some embodiments, the recess can comprise the coolant jacket 62. In some embodiments, the coolant jacket 62 can substantially circumscribe at least a portion of the electric machine 20. For example, the coolant jacket 62 can substantially circumscribe at least a portion of the outer perimeter 43 of the stator assembly 26, including the stator winding 36 as it extends on both the first end 50 and the second end 52 (i.e., the stator end turns 54).

Further, in some embodiments, the coolant jacket 62 can contain a coolant that can comprise transmission fluid, ethylene glycol, an ethylene glycol/water mixture, water, oil, motor oil, a mist, a gas, or another substance capable of receiving heat energy produced by the electric machine module 10. The coolant jacket 62 can be in fluid communication with a coolant source (not shown) which can pressurize the coolant prior to or as it is being dispersed into the coolant jacket 62, so that the pressurized coolant can circulate through the coolant jacket 62.

Also, in some embodiments, the inner surface 64 and/or the canister 15 can include coolant apertures 68 so that the coolant jacket 62 can be in fluid communication with the machine cavity 22. In some embodiments, the coolant apertures 68 can be positioned substantially adjacent to the stator end turns 54. For example, in some embodiments, as the pressurized coolant circulates through the coolant jacket 62, at least a portion of the coolant can exit the coolant jacket 62 through the coolant apertures 68 and enter the machine cavity 22. Also, in some embodiments, the coolant can contact the stator end turns 54, which can lead to at least partial cooling, at least partially depending upon machine 20 operations. After exiting the coolant apertures 68, at least a portion of the coolant can flow through portions of the machine cavity 22 and can contact various module 10 elements, which, in some embodiments, can lead to at least partial cooling of the module 10.

In some embodiments, at least a portion of the coolant can originate from and/or substantially adjacent to the rotor assembly 24. For example, in addition to portions of the stator assembly 26 generating thermal energy, the rotor assembly 24 can also generate thermal energy and may require cooling for enhanced performance. In some embodiments, portions of the rotor assembly 24, such as the shaft 30 and/or the rotor hub 32 can comprise one or more channels (not shown) that are in fluid communication with the coolant source. As a result, in addition to, or lieu of coolant entering the machine cavity 22 via the coolant jacket 62, at least a portion of the coolant can enter the machine cavity 22 via the rotor assembly 24 in a manner substantially similar to the coolant flow paths disclosed in U.S. patent application Ser. No. 13/016,940, which is assigned to the same assignee as the present application and is herein incorporated by reference in its entirety.

Figure 7:
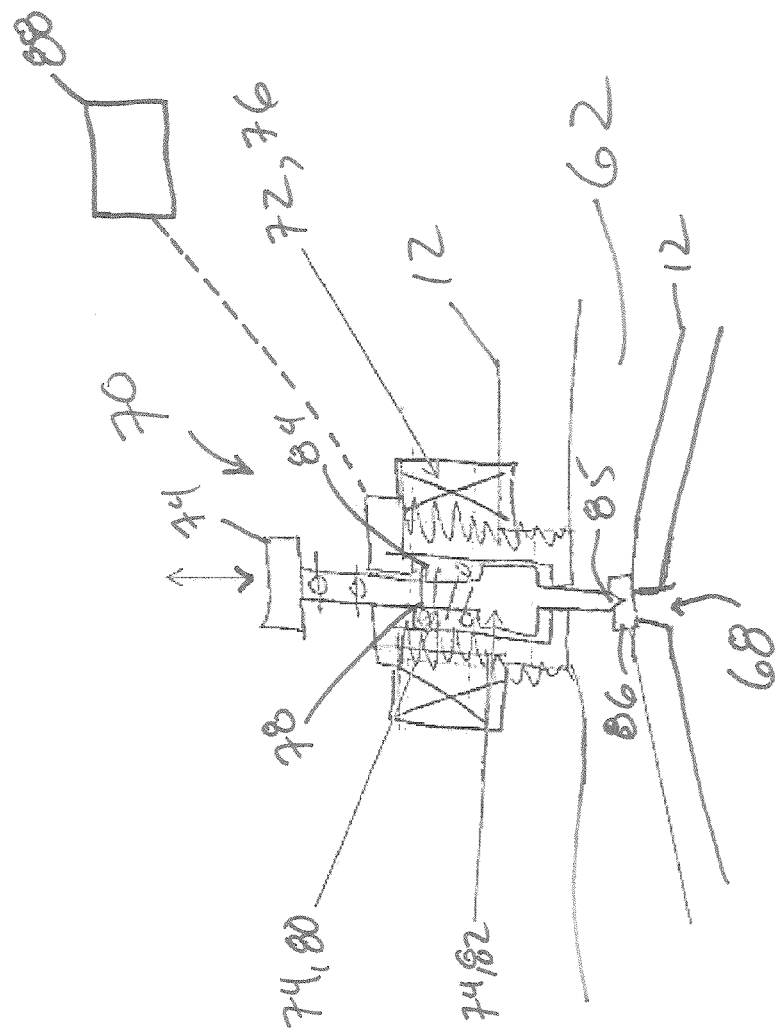
FIG. 7 is a partial cross-sectional view of a solenoid assembly according to one embodiment of the invention.

In some embodiments, the electric machine module 10 can be configured to enable improved and/or optimized coolant distribution through at least some of the coolant apertures 68. As shown in FIGS. 7 and 8, in some embodiments, the electric machine module 10 can comprise one or more valves 85 coupled to one or more solenoid assemblies 70 disposed within, supported by, and/or coupled to the housing 12 so that they are substantially adjacent to some or all of the coolant apertures 68. For example, as discussed below, some or all of the solenoid assemblies 70 can be configured and arranged to regulate at least a portion of coolant flow from the coolant jacket 62 into the machine cavity 22. As shown in FIG. 7, in some embodiments, the solenoid assemblies 70 can be coupled to a portion of the housing 12. For example, at least a portion of some of the solenoid assemblies 70 can be at least partially positioned between the inner surface 64 and the outer surface 66 and/or the canister 15 and the additional housing. As a result of this positioning, in some embodiments, at least a region of some or all of the solenoid assemblies 70 can extend into the coolant jacket 62, which can lead to regulation of coolant flow from the coolant jacket 62 to the machine cavity 22.

In some embodiments, the solenoid assemblies 70 can comprise a core 72, a plunger 74, one or more coils 76, and a spring 78. For example, some or all of the solenoid assemblies 70 can comprise a conventional solenoid configuration, and in some embodiments, some of the solenoid assemblies 70 can comprise non-conventional solenoid configurations. In some embodiments, the cores 72 can be coupled to at least a portion of the housing 12. For example, the cores 72 can be disposed through and coupled to at least a portion of the housing 12 and arranged around at least a portion of a circumference of the housing 12 so that the solenoid assemblies 70 at least partially circumscribe portions of the electric machine 20 (e.g., the stator assembly 26, including the stator end turns 54). Moreover, in some embodiments, the cores 72 can be positioned so that at least a portion of the solenoid assemblies 70 (e.g., the plunger 74) are substantially adjacent (e.g., radially outward) to at least some of the coolant apertures 68, as shown in FIG. 7.

As previously mentioned, in some embodiments, some or all of the solenoid assemblies 70 can comprise a conventional solenoid configuration, as shown in FIGS. 7 and 8. For example, the plunger 74 can be at least partially disposed within the core 72 and configured and arranged to move within the core 72. In some embodiments, the core 72 and/or the plunger 74 can comprise an iron-containing material, a steel-containing material, or any other material capable of functioning in an electromagnetic capacity. In some embodiments, some or all of the solenoid assemblies 70 can comprise one or more alternative configurations. For example, to reduce power consumption, noise, size occupied by the solenoid assembly 70, and weight of the solenoid assembly 70, at least a portion of the plunger 74 can comprise a non-iron or steel-containing material and the solenoid assembly 70 can be actuated by an iron or steel-containing plunger (e.g., servo-actuated).

In some embodiments, the plunger 74 can be configured and arranged to include multiple perimeters. For example, as shown in FIG. 7, the plunger can comprise a first region 80 and a second region 82. In some embodiments, the first region 80 can comprise a lesser perimeter relative to the second region 82. As a result, when the solenoid assembly 70 is inactive, a gap 84 can be defined between the first region 80 and an inner periphery of the core 72. Furthermore, in some embodiments, the spring 78 can be disposed around at least a portion of the first region 80 of the plunger 74 and can contact the inner periphery of the core 72 to bias the plunger 74 when the solenoid assembly 70 is in an inactive state. In some embodiments, when the solenoid assembly 70 is inactive, the plunger 74 can be disposed so that the valve 85 can be positioned immediately adjacent to one or more coolant apertures 68, as shown in FIG. 7. For example, a first end of the plunger 74 can comprise the valve 85, which can be configured and arranged to seal the coolant aperture 68 so that no material volumes of coolant can enter the machine cavity 22 through the coolant apertures 68 immediately adjacent to inactive solenoid assemblies 70. In some embodiments, some or all of the coolant apertures 68 can comprise a valve seat 86 that can be configured and arranged to receive a portion of the valve 85 to substantially seal the coolant apertures 68 so that no material volumes of coolant can enter the machine cavity 22, as shown in FIGS. 8A and 8B.

In some embodiments, the coil 76 can be at least partially disposed (e.g., wound) around an outer periphery of the core 72 and can be connected to one or more current sources. As a result of the coil's 76 positioning around the outer periphery of the core 72, a magnetic field can be generated when a current circulates through the coil 76. Moreover, the magnetic field generated by the current circulating through the coil 76 can cause the plunger 74 to move. The magnetic field can cause the plunger 74 to move to substantially or completely to eliminate the gap 84 between the plunger 74 and the inner periphery of the core 72. For example, the second region 82 of the plunger 74 can radially and/or axially move (e.g., can be pulled by the magnetic field) to a position substantially similar to where the first region 80 was disposed when the solenoid assembly 70 was inactive, which can lead to at least partial compression of the spring 78. In some embodiments, as long as current circulates through the coil 76 and the solenoid assembly 70 comprises a magnetic field, the second region 82 can remain in a substantially similar position (i.e., a position substantially similar to the position of the first region 80 when the solenoid assembly 70 is inactive). Additionally, in some embodiments, at least some of the solenoid assemblies 70 can be configured and arranged so that the coolant apertures 68 are generally unobstructed and, upon energization, the solenoid assemblies 70 can substantially or completely seal the coolant apertures 68. Accordingly, in some embodiments, the solenoid assemblies 70 can be configured and arranged to enable a coolant flow upon activation of one or more of the assemblies 70. In some embodiments, at least a portion of the solenoid assemblies 70 can be configured and arranged to obstruct coolant flow through the coolant apertures 68 upon activation of one or more of the assemblies 70.

Furthermore, in some embodiments, as a result of the plunger 74 moving, the valve 85 can disengage from the valve seat 86 to enable coolant to flow into the machine cavity 22, which can lead to cooling of the stator end turns 54 and/or other elements of the electric machine module 10, as shown in FIG. 8B. Conversely, when current either substantially or completely ceases flowing through the coil 76, the magnetic field can weaken and/or dissipate, which can lead to the second region 82 returning to its original position. For example, the plunger 74 can return to its original position because the force of the magnetic field retaining the second region 82 in position can weaken to a point where the biasing force of the spring 78 can overcome the magnetic field and move the plunger 74 back to the original position to form the gap 84 between the first region 80 and the inner periphery of the core 72. As a result, the valve 85 can engage the valve seat 86 to substantially seal one or more coolant apertures 68 to prevent material volumes of coolant from entering the machine cavity 22, as shown in FIG. 8A.

In some embodiments, some or all of the solenoid assemblies 70 can be activated and/or deactivated to coordinate electric machine module 10 cooling. In some embodiments, one or more sensors (e.g., temperature sensors 89) can be coupled to portions of the electric machine module 10. For example, in some embodiments, a plurality of temperature sensors 89 can be coupled to the inner surface 64 and/or portions of the stator assembly 26, such as the stator end turns 54 and/or the stator core 34. The temperature sensors 89 can be disposed around some or all of the circumference of the stator end turns 54 at regular and/or irregular intervals at the first axial end 50 and/or the second axial end 52 of the stator core 34. In some embodiments, the temperature sensors 89 can be disposed in other locations so that operating temperatures of the stator assembly 26 and other portions of the module 10 can be detected by the sensors 89. In some embodiments, the positioning of some or all of the temperature sensors 89 can be at least partially determined by ranges in temperature associated with various machine speeds, loads, and/or directions. In some embodiments, the module 10 can comprise any other devices that are configured and arranged to measure temperature of the electric machine module 10.

In some embodiments, some or all of the sensors 89 can be in communication (e.g., wired and/or wireless communication) with some or all of the solenoid assemblies 70 and/or an electronic control module 88, as shown in FIG. 7. For example, some or all of the solenoid assemblies 70 can be activated upon receiving input from at least a portion of the sensors 89. In other embodiments, some or all of the sensors 89 can communicate temperature data to the electronic control module 88. For example, in some embodiments, the electric machine module 10 can be installed within a vehicle and the temperature sensors 89 can be in communication with the electronic control module 88 of the vehicle. In other embodiments, the electric machine module 10 can comprise one or more electronic control modules 88. Regardless of positioning, the electronic control module 88 can be in communication with some or all of the solenoid assemblies 70 and can be configured and arranged to activate and/or deactivate the solenoid assemblies 70 at least partially based upon temperature data received from the sensors 89.

Figure 6:
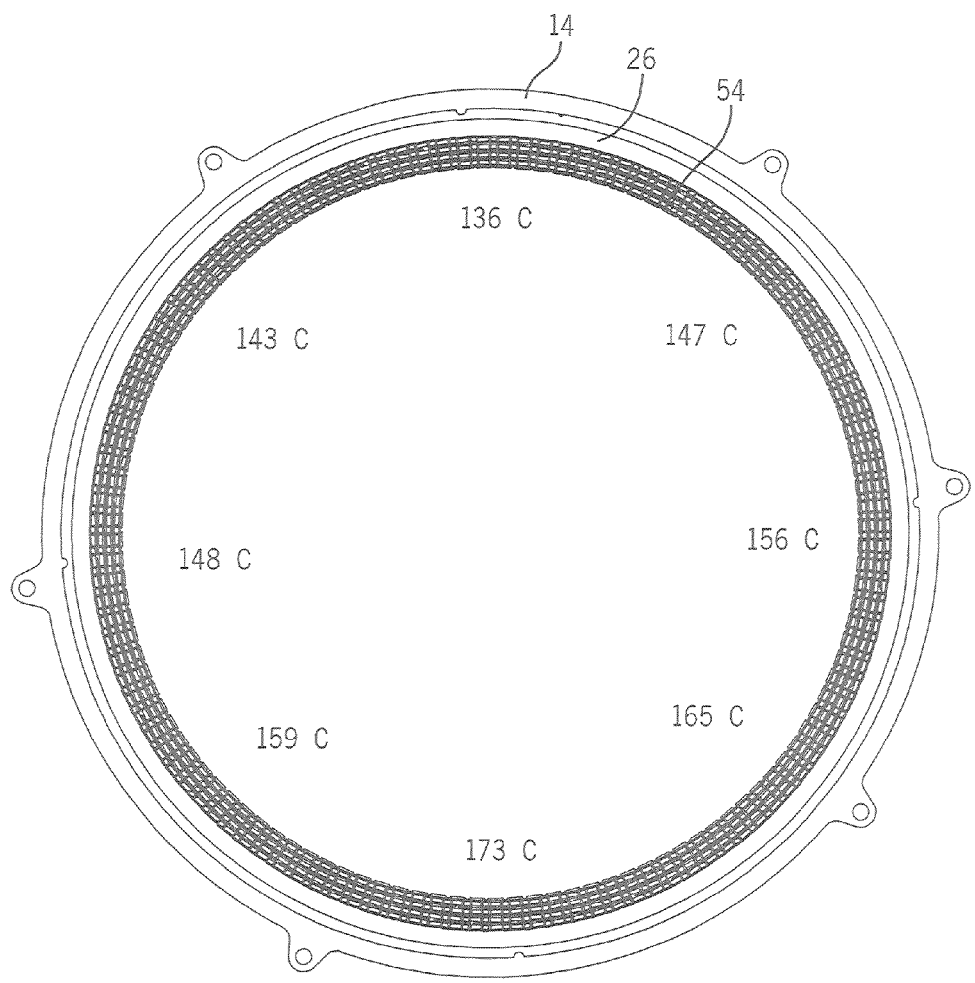
FIG. 6 is a side view of a stator assembly illustrating a temperature differential according to one embodiment of the invention.

In some embodiments, the electronic control module 88 can comprise one or more programs designed to optimize cooling of the electric machine module 10. For example, the electronic control module 88 can control the current flow to the coils 76 of at least some of the solenoid assemblies 70. As a result of controlling current flow, the electronic control module 88 can also control coolant flow through the valve seat 86 and at least a portion of the coolant apertures 68. Upon receiving temperature data from one or more sensors 89 indicating that the temperature in one or more regions of the stator end turns 54 is over a predetermined threshold, the electronic control module 88 can enable current flow to the coils 76 of some or all of the solenoid assemblies 70 substantially adjacent to the location where the temperature sensor is detecting an over-temperature condition. For example, if the electronic control module 88 receives data from some or all of the temperature sensors 89 and some of the sensors 89 substantially adjacent to a "twelve o'clock" and a "nine o'clock" position of the stator assembly 26, as illustrated in FIG. 6, transmit data suggesting that these regions of the stator end turns 54 are operating above a predetermine threshold, the electronic control module 88 can enable current flow to at least a portion of the solenoid assemblies 70 substantially adjacent to the "twelve o'clock" and "nine o'clock" positions. Coolant can exit the coolant jacket 62 (i.e., because the valve 85 at least partially disengages from the valve seat 86 to enable coolant efflux from the coolant jacket 62) and contact the stator end turns 54, at least some of which are operating at temperatures at or above the predetermined threshold.

In some embodiments, current can flow to the selected solenoid assemblies 70 for a predetermined time to enable a predetermined volume of coolant to exit the coolant jacket 62. In other embodiments, current can flow to the selected solenoid assemblies 70 until the temperature sensors 89 adjacent to the activated solenoid assemblies 70 transmit temperature data to the electronic control module 88 that is indicative of the temperature of the stator end turns 54 returning to an acceptable temperature range. Additionally, in some embodiments, current can continuously flow through the coils 76 of the activated solenoid assemblies 70. In other embodiments, current can be controlled via pulse-width modulation so that the plunger 74 is sealing and unsealing the coolant apertures 68 to control coolant flow from the coolant jacket 62 into the machine cavity 22. For example, if the current was configured to flow to the solenoid assemblies 70 at a 25% duty cycle, about one-quarter of the volume of coolant would flow through the coolant apertures 68, compared to a solenoid assembly 70 operating at a 100% duty cycle (i.e., in a constantly energized state). Moreover, in some embodiments, the housing 12 can comprise one or more coolant apertures 68 functioning without a solenoid assembly 70 so that coolant can substantially continuously flow from the coolant jacket 62 into the machine cavity 22. Accordingly, some regions of the module 10 can experience substantially continuous changes in coolant flow from the coolant jacket 62 depending on the temperature sensed (e.g., solenoid assemblies 70 activating and deactivating as a result of temperature increases and decreases at the stator end turns 54).

In some embodiments, the electronic control module 88 can comprise alternative control capabilities. In some embodiments, in lieu of being in communication with some or all of the temperature sensors 89, the electronic control module can be preprogrammed with temperature data so that the control module 88 can activate some or all of the solenoid assemblies 70 at predetermined times. For example, temperature data can be gathered during assembly and/or design of the electric machine module 10 that is indicative of temperature of different sections of the stator end turns 54 operating under different conditions (e.g., load, direction, and speed). As a result, during operation of the electric machine module 10, the electronic control module can assess the operational state of the module 10 (e.g., load magnitude, direction of the machine 20, speed of the machine 20, etc.) and can compare the operational state to the preprogrammed temperature data to determine which solenoid assemblies 70 should be energized to cool stator end turns 54 that are likely to exceed a desirable temperature based at least partially on the operational state.

In some embodiments, in addition to, or in lieu of the electronic control module 88 and/or the temperature sensors 89, some or all of the solenoid assemblies 70 can comprise a passive temperature regulating system (not shown). For example, some or all of the solenoid assemblies 70 can comprise a conventional thermostat or other passively-operating temperature sensing devices so that when the thermostat detects thermal output from the electric machine module 10 that exceeds the predetermined threshold, the conventional thermostat can activate some or all of the solenoid assemblies 70. Moreover, in some embodiments, one thermostat can be in communication with each of the solenoid assemblies 70, each solenoid assembly 70 can be in communication with a thermostat, and some of the solenoid assemblies 70 can be in communication with one or more thermostats.

Some embodiments of the invention offer improvements relative to some conventional cooling configurations. As previously mentioned, some conventional cooling configurations can be substantially fixed at the design stages of the module 10 because only coolant apertures 68 can be included in the housing 12 to enable coolant flow. As a result, at least some conventional cooling configurations fail to provide cooling capabilities that are adaptive to changes in module 10 conditions, such as load, direction, and speed. Some embodiments of the invention enable coolant flow to be optimized so that coolant is provided to areas of the module 10 that are operating at higher temperatures. The solenoid assemblies 70 can enable optimized coolant flow so that accurate and adequate cooling can occur and the electric machine module 10 can operate at or near peak performance levels for an extended duration. Moreover, by being able to optimize cooling based on temperature, electric machine modules 10 can be employed in any number of configurations and applications. For example, electric machine modules 10 can be installed in any number of applications and the optimized cooling configuration including the solenoid assemblies 70 can be employed to provide coolant regardless of positioning or use of the module 10 because of its temperature-based cooling.

In some embodiments, coolant flow controlled by the solenoid assemblies 70 can at least partially impact rotor assembly 24 cooling. As previously mentioned, in some embodiments, a volume of coolant can enter the machine cavity 22 after flowing through portions of the rotor assembly 24 and the shaft 30 in addition to coolant flowing from the coolant jacket 62. As a result of coolant flowing through portions of the rotor assembly 24, at least a portion of the torque generated by the rotor assembly 24 moving during electric machine 20 operations can be lost. Some embodiments of the invention can enable cooling of the rotor assembly 24 and minimize the torque loss stemming from coolant flow through the rotor assembly 24. For example, in some embodiments, the coolant jacket 62 and the rotor assembly 24 and shaft 30 can be coupled to one or more of the same coolant sources. In some embodiments, some or all of the solenoid assemblies 70 can be energized so that coolant can flow through some or all of the coolant apertures 68. As a result, at least a portion the coolant that would normally flow through the shaft 30 and the rotor assembly 24 can be diverted through the open coolant apertures 68 leading to minimized torque losses because of the decreased coolant flow through the rotor assembly 24. Moreover, although the rotor assembly 24 will comprise a lesser coolant flow relative to when coolant is not flowing through some of the coolant apertures 68, at least a portion of the rotor assembly 24 can still be cooled because of the increased coolant flow through the coolant apertures 68 leading to greater volumes of coolant entering the machine cavity 22.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
a housing at least partially defining a machine cavity;
a coolant jacket configured to hold a coolant, the coolant jacket being at least partially defined by the housing;
a plurality of coolant apertures being disposed through portions of the housing to fluidly couple the coolant jacket and the machine cavity, wherein at least some of the plurality of coolant apertures comprise valve seats positioned within the coolant jacket; and
one or more solenoid assemblies being at least partially supported by the housing and being positioned substantially adjacent to at least a portion of the plurality of coolant apertures, the one or more solenoid assemblies each comprising a plunger each with an end that comprises a valve positioned within the coolant jacket, the valve configured to move through the coolant within the coolant jacket;
and wherein based at least in part upon temperature data received from temperature sensors, one or more of the solenoid assemblies are configured and arranged to regulate passage of at least a portion of a coolant into the machine cavity from the coolant jacket by movement of at least one valve across the coolant jacket through the coolant to engage with at least one of the valve seats,
an electric machine at least partially disposed within the machine cavity and enclosed by the housing, wherein the electric machine is positioned so that the coolant jacket circumscribes at least a portion of the electric machine; and
wherein the electric machine comprises stator end turns, and wherein at least some of the coolant apertures are disposed radially outward from at least a portion of the stator end turns and adjacent both ends of the electric machine.

2. The electric machine module of claim 1, wherein the solenoid assemblies further comprise a coil disposed around a core, and a spring.

3. The electric machine module of claim 1, wherein the at least one valve is configured and arranged to engage at least one of the valve seats to substantially seal at least one of the coolant apertures.

4. The electric machine module of claim 1, wherein the housing comprises a sleeve member coupled to at least one end cap and wherein the sleeve member comprises an inner surface and an outer surface and the coolant jacket is at least partially disposed between the inner surface and the outer surface.

5. The electric machine module of claim 1, wherein the housing comprises a canister coupled to at least one end cap and wherein at least a portion of the canister defines at least a portion of the coolant jacket.

6. An electric machine module comprising:
a housing at least partially defining a machine cavity;
a coolant jacket configured to hold a coolant, the coolant jacket being at least partially defined by the housing;
an electric machine comprising stator end turns being at least partially disposed within the machine cavity so that portions of the electric machine are at least partially circumscribed by the coolant jacket;
a plurality of coolant apertures being disposed radially outward and adjacent to stator end turns through portions of the housing to fluidly couple the coolant jacket and the machine cavity, wherein at least some of the plurality of coolant apertures are substantially adjacent to the stator end turns and adjacent both ends of the electric machine;
one or more solenoid assemblies comprising a plunger being at least partially supported by the housing and being positioned substantially adjacent to at least a portion of the plurality of coolant apertures, wherein the plunger of at least some of the solenoid assemblies is configured and arranged to engage at least some of the plurality of coolant apertures by moving through the coolant;
an electronic control module being in communication with at least a portion of the solenoid assemblies;
one or more temperature sensors coupled to at least one of the electric machine and the housing, the temperature sensors in communication with at least one of the electronic control module and one or more of the solenoid assemblies; and wherein the electronic control module is configured and arranged to control movement of the plunger across at least a portion of the coolant jacket through the coolant for engagement of the plunger with at least some of the plurality of coolant apertures to regulate a coolant flow based at least in part upon temperature data received from the temperature sensors.

7. The electric machine module of claim 6, wherein the housing comprises a sleeve member coupled to at least one end cap and wherein the sleeve member comprises an inner surface and an outer surface and the coolant jacket at least partially disposed between the inner surface and the outer surface.

8. The electric machine module of claim 6, wherein the housing comprises a canister coupled to at least one end cap and wherein at least a portion of the canister defines at least a portion of the coolant jacket.

9. The electric machine module of claim 6, wherein at least some of the solenoid assemblies are configured and arranged to be energized by circulating a current through the solenoid to enable a coolant flow into the machine cavity from the coolant jacket.

10. The electric machine module of claim 9, wherein the energization is pulse width modulated.

11. The electric machine module of claim 6, wherein an end of the plunger comprises a valve and the valve is configured and arranged to engage the coolant apertures to substantially seal the coolant apertures.

12. A method of assembling an electric machine module, the method comprising:

providing a housing at least partially defining a machine cavity and a coolant jacket, the coolant jacket configured to hold a coolant;

positioning an electric machine at least partially within the machine cavity so that at least a portion of the electric machine is substantially circumscribed by the coolant jacket;

coupling one or more temperature sensors to at least one of the electric machine and the housing;

disposing a plurality of coolant apertures radially outward and adjacent to stator end turns through portions of the housing to fluidly couple the coolant jacket and the machine cavity, the plurality of coolant apertures comprising valve seats positioned within the coolant jacket and at least a portion of the plurality of coolant apertures are substantially adjacent to the end turns adjacent both ends of the electric machine;

positioning one or more solenoid assemblies substantially adjacent to at least a portion of the plurality of coolant apertures, and wherein based at least in part upon temperature data received from the one or more temperature sensors, the solenoid assemblies are configured and arranged to regulate passage of at least a portion of a coolant into the machine cavity from the coolant jacket by moving at least one plunger across at least a portion of the coolant jacket through the coolant to engage at least one valve seat.

13. The method of claim 12, and further comprising providing an electronic control module in communication with at least some of the solenoid assemblies.

* * * * *